(12) United States Patent
Nishi et al.

(10) Patent No.: US 9,584,796 B2
(45) Date of Patent: Feb. 28, 2017

(54) APPARATUS FOR SETTING INTERFERENCE REGION OF ROBOT

(71) Applicant: FANUC CORPORATION, Yamanashi (JP)

(72) Inventors: Hiroji Nishi, Yamanashi (JP); Shunichi Ozaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/876,194

(22) Filed: Oct. 6, 2015

(65) Prior Publication Data

US 2016/0112694 A1    Apr. 21, 2016

(30) Foreign Application Priority Data

Oct. 17, 2014   (JP) ................................. 2014-213052

(51) Int. Cl.
| | |
|---|---|
| *G06K 9/00* | (2006.01) |
| *H04N 13/02* | (2006.01) |
| *G06T 7/00* | (2006.01) |
| *G01B 11/14* | (2006.01) |
| *H04N 13/00* | (2006.01) |

(52) U.S. Cl.
CPC ......... *H04N 13/0239* (2013.01); *G01B 11/14* (2013.01); *G06T 7/0044* (2013.01); *G06T 2200/08* (2013.01); *G06T 2207/10012* (2013.01); *H04N 2013/0074* (2013.01)

(58) Field of Classification Search
CPC ............ H04N 13/0239; H04N 13/0275; G06T 2200/08; G06T 2207/10012
USPC .......................................................... 382/154
See application file for complete search history.

(56) References Cited

U.S. PATENT DOCUMENTS

| | | | |
|---|---|---|---|
| 9,182,763 B2* | 11/2015 | Park ..................... | G05D 1/0274 |
| 2006/0025888 A1* | 2/2006 | Gutmann .............. | G06T 7/0075 |
| | | | 700/245 |
| 2013/0325244 A1* | 12/2013 | Wang .................... | G05D 1/028 |
| | | | 701/26 |

FOREIGN PATENT DOCUMENTS

| | | |
|---|---|---|
| JP | 2005-081445 A | 3/2005 |
| JP | 2006-3263 A | 1/2006 |
| JP | 2010-44740 A | 2/2010 |
| JP | 2010-208002 A | 9/2010 |
| JP | 2011-235380 A | 11/2011 |
| JP | 2014-180707 A | 9/2014 |

* cited by examiner

*Primary Examiner* — Ruiping Li
(74) *Attorney, Agent, or Firm* — Hauptman Ham, LLP

(57) ABSTRACT

An apparatus for setting an interference region of a robot includes a 3D camera which photographs surroundings of a robot to acquire a camera image of a region around the robot including distance information and color information, a 3D map generation unit which generates a 3D map including a plurality of point sequences which are arranged at equal intervals in a 3D space around the robot on the basis of the camera image, a color setting unit which sets a color of the robot, a color search unit which searches for a point sequence including color information corresponding to the robot color from the 3D map, and an interference region setting unit which sets an interference region on the basis of position data of the searched point sequence.

3 Claims, 3 Drawing Sheets

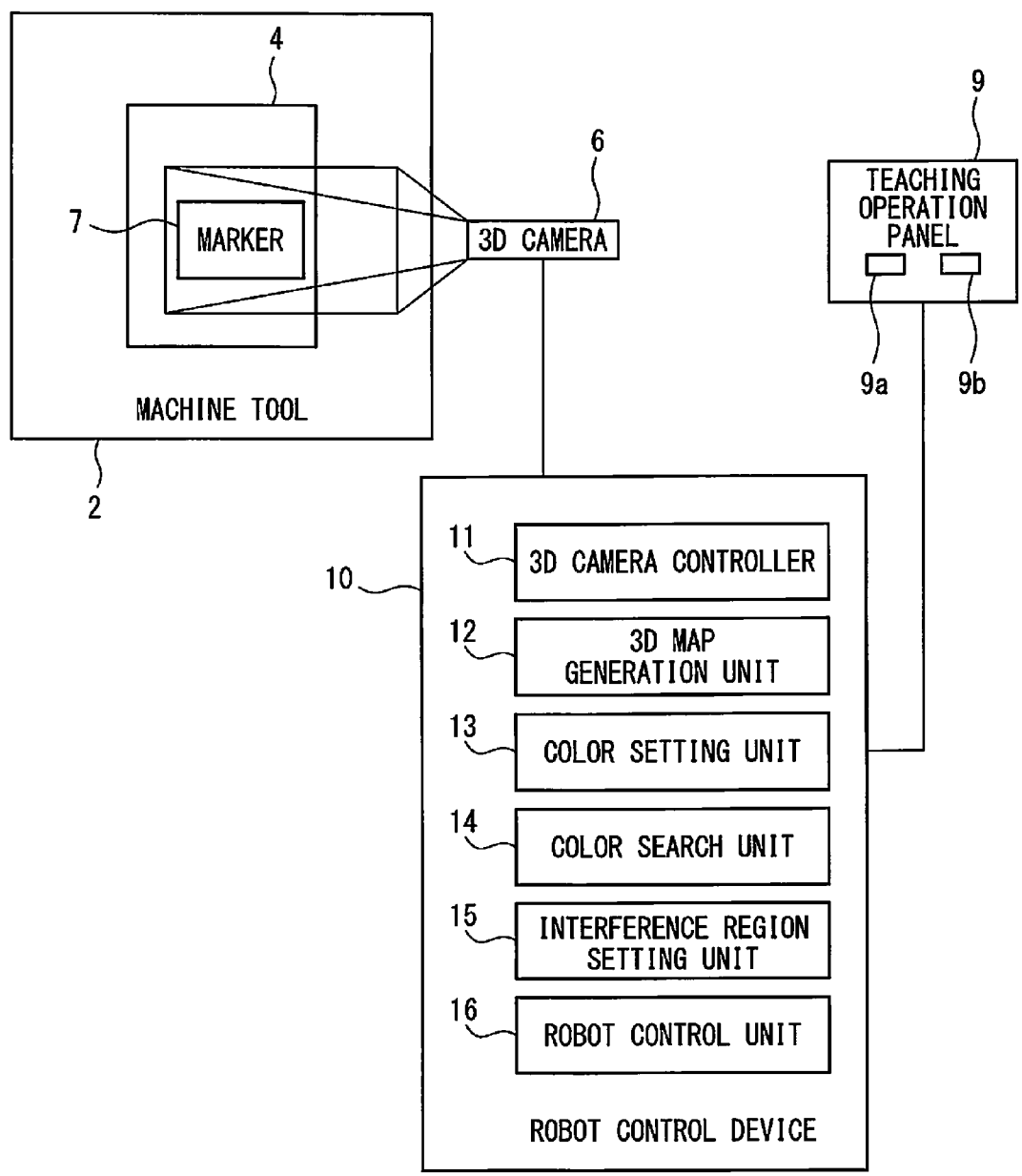

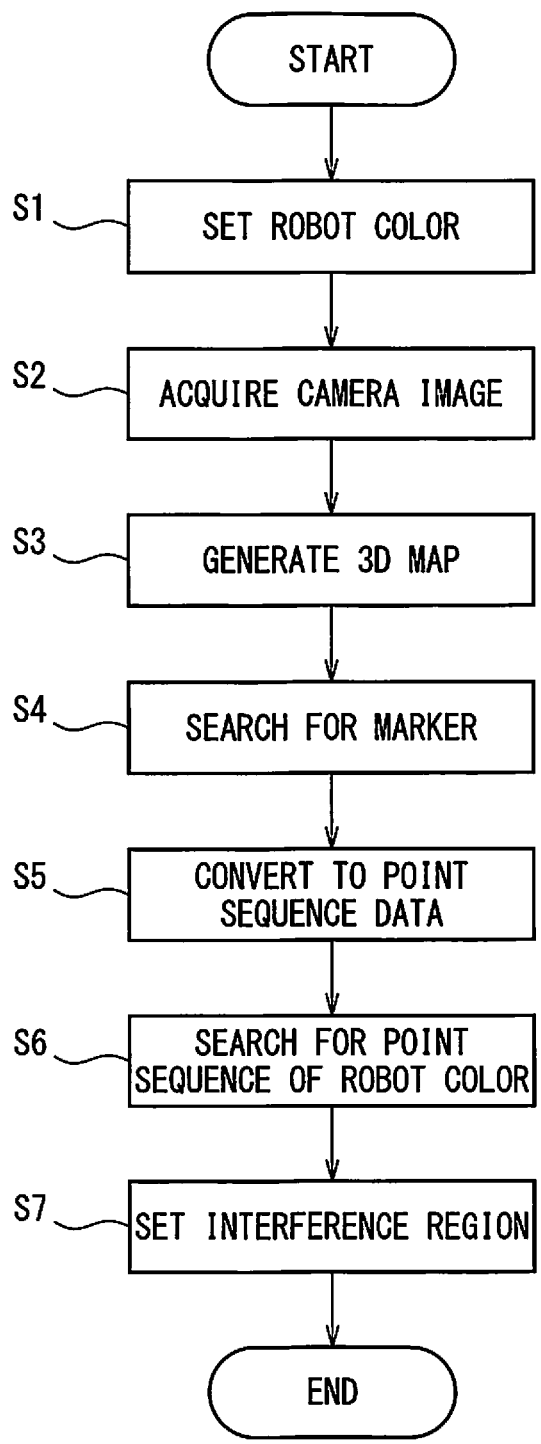

APPARATUS FOR SETTING INTERFERENCE REGION OF ROBOT

RELATED APPLICATIONS

The present application claims priority to Japanese Patent Application Number 2014-213052, filed on Oct. 17, 2014, the disclosure of which is hereby incorporated by reference herein in its entirety.

BACKGROUND OF THE INVENTION

1. Field of the Invention

The present invention relates to an interference region setting apparatus for setting an interference region of a robot.

2. Description of the Related Art

Conventionally, when performing work using a robot, an apparatus for setting an interference region where there is an obstacle or the like, around a robot, in order to avoid interference between the robot and the obstacle so as to inhibit the robot from entering the interference region is known. For example, Japanese Laid-open Patent Publication No. 2005-81445 describes an apparatus for setting an interference region to perform operation simulation in an offline state. The apparatus described in Japanese Laid-open Patent Publication No. 2005-81445 reads in three-dimensional (3D) shape data of a robot and an obstacle or the like from a CAD device to set an interference region on a screen using the 3D shape data. Furthermore, with mouse operation or like, the apparatus sets an interference region corresponding to a safety fence or the like on the screen.

However, in the apparatus of Japanese Laid-open Patent Publication No. 2005-81445, a three-dimensional shape model needs to be prepared in advance in order to set an interference region, and, additionally, the interference region needs to be manually input, thus requiring a great deal of time and labor.

SUMMARY OF INVENTION

An interference region setting apparatus for setting an interference region of a robot according to an aspect of the present invention includes a 3D camera which photographs surroundings of a robot to acquire a camera image of surroundings of a robot including distance information and color information. The interference region setting apparatus includes a 3D map generation unit which generates a 3D map including a plurality of point sequences which are arranged at equal intervals in a three dimensional space around the robot on the basis of the camera image and each of the point sequences are 3D map including the color information included in the camera image. The interference region setting apparatus includes a color setting unit which sets a color of at least one of the robot and an obstacle around the robot, the color makes the robot and the obstacle distinguishable. The interference region setting apparatus includes a color search unit which searches for a point sequence including color information corresponding to the color set by the color setting unit from the 3D map generated by the 3D map generation unit. The interference region setting apparatus includes an interference region setting unit which sets an interference region on the basis of position data of the point sequence searched by the color search unit, the position data is obtained by the distance information of the camera image.

BRIEF DESCRIPTION OF THE DRAWINGS

The object, features, and advantages of the present invention will become more apparent from the following embodiments taken in conjunction with the accompanying drawings in which:

FIG. 2 is a block diagram which shows the entire structure of the interference region setting apparatus according to the an embodiment of the present invention, and FIG. 3 is a flowchart which shows one example of a process which is executed by a robot control device of FIG. 2.

DETAILED DESCRIPTION

Figure 1:
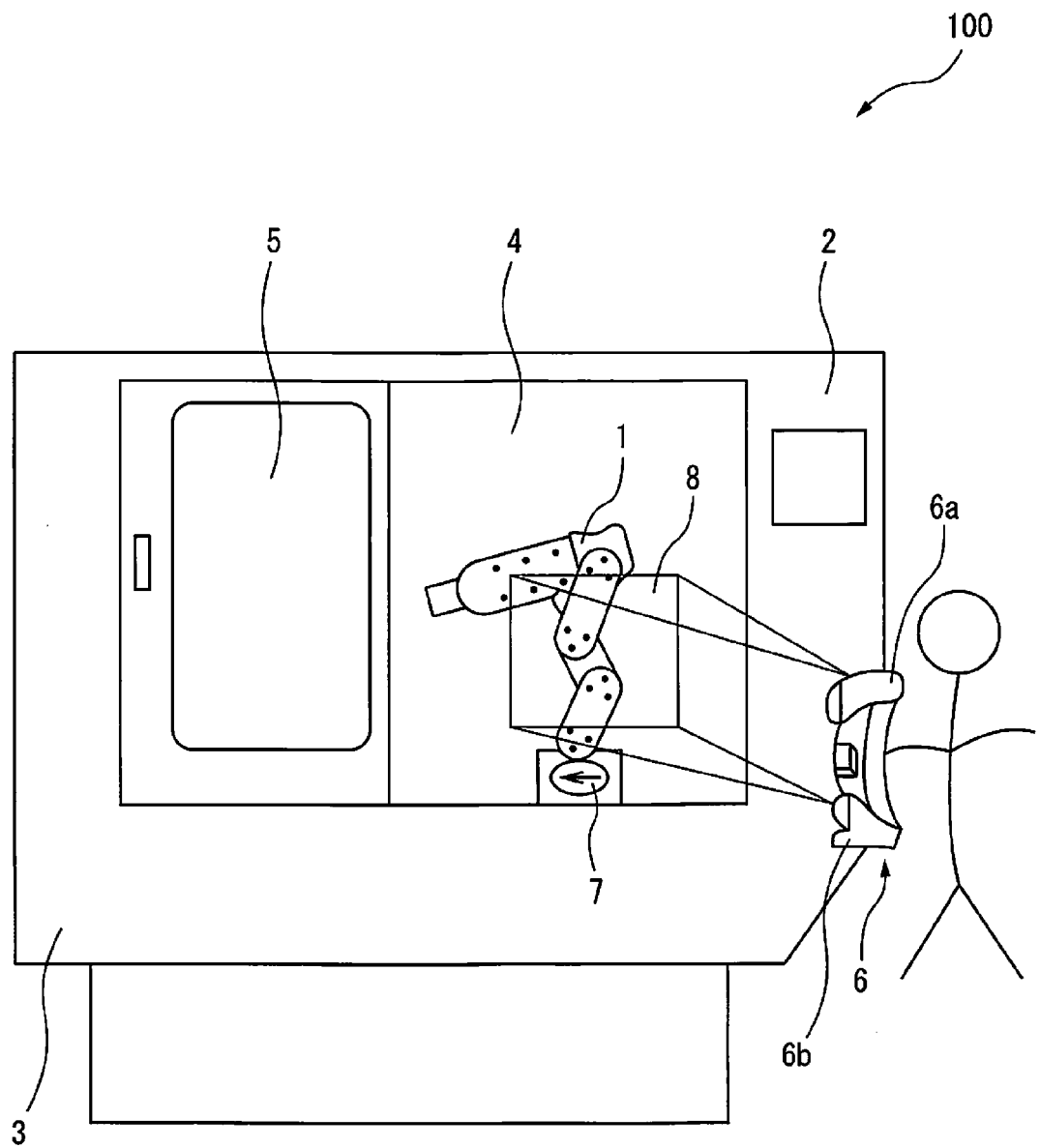
FIG. 1 is a diagram which shows one example of a processing system to which an interference region setting apparatus according to an embodiment of the present invention is applied.

Hereinafter, descriptions will be given of embodiments of the present invention with reference to FIGS. 1 to 3. FIG. 1 is a diagram depicting one example of a processing system 100 to which an interference region setting apparatus according to an embodiment of the present invention is applied. The processing system 100 includes a robot 1 and a machine tool 2. The machine tool 2 has a cover 3 and a processing chamber 4 is formed by cover 3. A part of the cover 3 is provided with an openable/closable door 5 and a workpiece is conveyed into the processing chamber 4 through the door 5 and the workpiece is processed in the processing chamber 4.

The robot 1 is located in the processing chamber 4. The robot 1 is, for example, a vertical articulated robot having a plural of rotatable arms. The robot 1 is operated by driving a servomotor to hold a workpiece, a jig, or the like at an arm distal end thereof, so as to assist processing of the workpiece by the machine tool 2. The robot 1 can be configured as a welding robot or a coating robot by attaching a welding device or a coating device to the arm distal end thereof to allow the robot 1 to process the workpiece in the processing chamber 4. The robot 1 is connected to a robot control device 10 (FIG. 2) to be controlled by the robot control device 10 according to a predetermined program. A worker can input a drive command for driving the robot 1 with the robot control device 10 in order to control the robot 1 according to the drive command.

In this manner, when the robot 1 located in the processing chamber 4 is activated through the operation by the worker, the robot 1 may interfere with a part of the machine tool 2 (such as a table, a floor, or the cover 3 in the processing chamber 4) or various members (which will hereinafter be referred to as obstacle) located in the processing chamber 4. Accordingly, preferably, an interference region where there is an obstacle is set around the robot 1 in advance to inhibit movement of the robot 1 into the interference region by means of the robot control device 10.

The interference region can be set, for example, by causing the worker to input a plurality of rectangular parallelepipeds whose dimensions and positions are different to the robot control device 10. However, such manual setting of the interference region takes time and labor. Furthermore, when the number of the rectangular parallelepipeds reaches an upper limit of an inputtable number of the rectangular parallelepipeds, the interference region cannot be set. The interference region can also be set using a 3D model of the obstacle. In this case, however, it is not easy, since the 3D model needs to be recreated every time the position and shape of the obstacle change. Thus, in the present embodiment, an interference region is set using a camera image of the surroundings of the robot 1 acquired by a 3D camera 6, as will be described below.

The 3D camera 6 photographs a target object simultaneously from different directions to generate a parallax, thereby acquiring distance information on a distance up to the target object, and therefore it is a kind of stereo camera. The 3D camera 6 includes a pair of cameras 6a and 6b located to be spaced apart by a predetermined distance. The pair of cameras 6a and 6b each has an image sensor. The 3D camera 6 of the present embodiment acquires not only distance information of the target object but also color information (such as RGB) of the object. The 3D camera 6 may a type of camera which emits a laser to acquire distance information of a reflection point from a reflection position and a reflection time.

In setting an interference region, first, the 3D camera 6 photographs surroundings of the robot 1 (an entire region of the processing chamber 4). The robot 1 has a marker 7 (an arrow in the drawing) attached thereto which indicates a reference point (for example, an origin) of a robot coordinate system. Accordingly, by photographing the region including the marker 7 by the 3D camera 6, i.e., by including the marker 7 within a photographing range 8, the position (XYZ coordinates) of the target object included within the photographing range 8 can be represented using the robot coordinate system.

FIG. 1 depicts an example in which a worker holds the 3D camera 6 to photograph an image. On the other hand, photographing can also be executed by holding the 3D camera 6 on a camera stand capable of changing the position and posture of the 3D camera 6 and by means of a photographing command from outside. In this case, the position and posture of the 3D camera 6 can be adjusted by outputting a control signal to an actuator for driving the camera stand. At this time, when the entire region of the processing chamber 4 is not included within the photographing range 8, the position and posture of the 3D camera 6 are changed to repeat photographing a plurality times from a plurality of positions and a plurality of directions until photographing of the entire region of the processing chamber 4 is finished. A plurality of camera images obtained thereby is synthesized, thereby allowing acquisition of distance information of the entire region of the processing chamber 4 in the robot coordinate system. In this case, without adjusting the position and posture of the camera by the camera stand, there may be used a camera which can synthesize a plurality of images photographed by holding the camera in hands.

FIG. 2 is a block diagram depicting the entire structure of the interference region setting apparatus according to an embodiment of the present invention. A part of the interference region setting apparatus is formed by a robot control device 10. The robot control device 10 includes, as functional elements, a 3D camera controller 11, a 3D map generation unit 12, a color setting unit 13, a color search unit 14, an interference region setting unit 15, and a robot control unit 16.

A teaching operation panel 9 is connected to the robot control device 10. The teaching operation panel 9 includes an input unit 9a and can input various commands to the robot control device 10 via the input unit 9a. Additionally, the teaching operation panel 9 includes a display unit 9b and can display various command values, calculation results, an interference region, and the like via the display unit 9b.

The 3D camera controller 11 controls the 3D camera 6. Specifically, a photographing command is output to the 3D camera 6 to adjust a photographing timing, and possibly adjusts laser emission timing. When the 3D camera 6 is held by the camera stand, the 3D camera controller 11 can output a control signal to the camera stand to change the position and posture of the 3D camera 6. A camera image acquired by the 3D camera 6 is stored in a memory serving as a storage unit of the robot control device 10.

The 3D map generation unit 12 generates a 3D map by locating a plurality of point sequences at equal intervals in a 3D space around the robot 1 on the basis of the camera image (distance information) stored in the memory. Specifically, the 3D map generation unit 12 specifies the positions of the robot 1 and an obstacle by using the camera image and sets the point sequences at the equal intervals in the 3D space formed by the robot 1 and the obstacle. At the step where the 3D map is generated, the robot 1 and the obstacle are not distinguished yet.

Each point sequence which forms the 3D map forms a square region having a minute length. Each point sequence includes data of color information (RGB) included in the camera image. Specifically, when a point sequence corresponds to the robot 1 or the obstacle, the point sequence includes color information thereof. On the other hand, when the point sequence corresponds to a space of the processing chamber 4 where there is nothing, color information (for example, R, G, B=0, 0, 0) for distinguishing the space from the robot 1 and the obstacle is given to the point sequence. The 3D map generation unit 12 further specifies an image of the marker 7 from the camera image acquired by the 3D camera 6 by pattern matching or the like to give color information (for example, R, G, B=1, 1, 1) distinguishable from other point sequences to a point sequence corresponding to the marker 7.

The color setting unit 13 sets a color (an external color) of the robot 1 commanded via the teaching operation panel 9. The color setting unit 13 sets a color which makes the robot 1 and the obstacle distinguishable. In the present embodiment, the robot 1 and the obstacle are formed using mutually different colors (respectively referred to as robot color and obstacle color). For example, a robot color is yellow, and an obstacle color is a color other than yellow (for example, gray). The robot color may include a plurality of colors (for example, yellow and red). In that case, the obstacle color is a single color or a plurality of colors other than yellow and red.

The color search unit 14 searches for the point sequence including the color information corresponding to the marker 7 from the 3D map generated by the 3D map generation unit 12. By using the searched point sequence as a reference point (the origin), each point sequence of the 3D map can be converted to point sequence data in the robot coordinate system. Furthermore, the color search unit 14 searches for a point sequence including color information (RGB) corresponding to the robot color (yellow) set by the color setting unit 13. The robot color may be subtly different between respective units of the robot due to change with time or the like. Accordingly, in searching for a point sequence, preferably, color information is set to have a predetermined range to search for a point sequence located within the range.

The interference region setting unit 15 excludes the point sequence of the robot color searched by the color search unit 14 from the point sequences of the 3D map. Then, the interference region setting unit 15 sets an interference region on the basis of position data of remaining point sequences of the 3D map. Thereby, an interference region is set by only position data of the obstacle. The set interference region is stored in the memory.

The robot control unit 16 outputs a control signal to the robot driving servo motor on the basis of a predetermined processing program or in response to a command from a worker to operate the robot 1. In this case, the robot control unit 16 judges, whenever necessary, whether or not the robot 1 has entered the interference region. The robot control unit 16 stops operation of the robot 1 by outputting a stop signal to the servo motor when the robot 1 enters the interference region or is about to enter the interference region. Thereby, collision of the robot 1 with the obstacle can be prevented.

FIG. 3 is a flowchart depicting one example of a process which is executed by the robot control device 10. The process depicted by the flowchart is started, for example, when a worker inputs an interference region setting command to the robot control device 10.

At a step S1, the color setting unit 13 sets a robot color input via the teaching operation panel 9. At a step S2, the 3D camera controller 11 outputs a control signal to the camera stand and the 3D camera 6 to photograph the entire region of the processing chamber 4, thereby acquiring a camera image including the marker 7. At a step S3, the 3D map generation unit 12 generates a 3D map including a plurality of point sequences in a 3D space around the robot 1 on the basis of the camera image.

At a step S4, the color search unit 14 searches for the marker 7 from the 3D map. At a step S5, the 3D map generation unit 12 uses a point sequence corresponding to the marker 7 as a reference to convert each point sequence of the 3D map to point sequence data in the robot coordinate system. At a step S6, the color search unit 14 searches for a point sequence including color information corresponding to the robot color set at the step S1. At a step S7, the interference region setting unit 15 excludes the point sequence of the robot color from the point sequences of the 3D map and sets an interference region using position data of remaining point sequences of the 3D map.

According to the present embodiment, there can be provided the following functions and effects:

(1) The interference region setting apparatus includes the 3D camera 6 which photographs the surroundings of the robot 1 to acquire a camera image of a region around the robot 1, including distance information and color information. The interference region setting apparatus includes the 3D map generation unit 12 which generates a 3D map including a plurality of point sequences which are arranged at equal intervals in a 3D space around the robot 1 on the basis of the camera image and the color setting unit 13 which sets a color of the robot 1. The interference region setting apparatus includes the color search unit 14 which searches for a point sequence including color information corresponding to the robot color from the 3D map generated by the 3D map generation unit 12 and the interference region setting unit 15 which sets an interference region on the basis of position data of the searched point sequence. Thereby, a user does not need to manually input an interference region and does not need to create a 3D shape model of an obstacle, and therefore interference regions having various shapes can be easily set.

(2) The color setting unit 13 sets a robot color, the color search unit 14 searches for a point sequence (a robot point sequence) including color information corresponding to the robot color from the 3D map, and the interference region setting unit 15 sets an interference region on the basis of position data of remaining point sequences of the 3D map excluding the robot point sequence. Accordingly, an appropriate interference region excluding the robot 1 can easily be set.

(3) The camera image includes an image of the marker 7 which is a reference of a robot coordinate system, and the interference region setting unit 15 sets an interference region in the robot coordinate system on the basis of the image of the marker 7. Accordingly, the position of the robot 1 and the interference region can be represented in the same coordinate system, and therefore the presence or absence of entry of the robot 1 into the interference region can easily be judged.

In the above embodiment, while the color setting unit 13 has set the color of the robot, it may set the color of an obstacle. In this case, the color search unit 14 searches for a point sequence (an obstacle point sequence) including color information corresponding to the color of the obstacle from the 3D map, and the interference region setting unit 15 sets an interference region on the basis of position data of the obstacle point sequence. The color setting unit 13 may set both of a robot color and an obstacle color, and the color search unit 14 may search for each of a robot point sequence and an obstacle point sequence from the 3D map. In other words, the configuration of interference region setting unit 15 can be arbitrarily selected as long as the interference region setting unit 15 sets an interference region on the basis of position data of a point sequence searched by the color search unit 14.

In the above embodiment, color information distinguishable from other point sequences has been given to the point sequence corresponding to the marker 7 to search for the marker 7 from the 3D map (the step S4). However, in generating the 3D map, an identifier may be added to data of the point sequence corresponding to the marker 7 to distinguish the point sequence of the marker 7 from the other point sequences. In other words, the marker 7 may be searched by any other element as long as the interference region setting unit 15 sets an interference region in the robot coordinate system on the basis of the image of the marker 7 specified by the camera image.

According to the present invention, a user does not need to set by manually inputting an interference region and does not need to prepare a 3D shape model of an obstacle, thus allowing the facilitation of setting of an interference region.

The description provided hereinabove is merely one example. The present invention is not limited by the above embodiment and modifications as long as the features of the invention are not impaired. The constituent elements of the above embodiment and modifications include those replaceable and obviously replaceable while maintaining the identity of the invention. In other words, any other mode conceivable within the technical range of the present invention is included within the scope of the invention. In addition, the above embodiment and one or a plurality of the modifications can be optionally combined together.

The invention claimed is:

1. An apparatus for setting an interference region of a robot, comprising:
   a 3D camera which photographs surroundings of a robot to acquire a camera image of a region around the robot including distance information and color information, which is configured to synthesize a plurality of images, and in which a position and a posture are changeable;
   a 3D map generation unit which generates a 3D map comprising a plurality of point sequences which are arranged at equal intervals in a 3D space around the robot on a basis of the camera image, each of the point sequences including the color information included in the camera image;

a color setting unit which sets a color of at least one of the robot and an obstacle around the robot, the color being a color which makes the robot and the obstacle distinguishable;

a color search unit which searches for a point sequence including color information corresponding to the color set by the color setting unit from the 3D map generated by the 3D map generation unit; and an interference region setting unit which sets an interference region, which is a region where the obstacle exists, on a basis of position data of the point sequence searched by the color search unit, the position data being obtained by the distance information of the camera image; wherein the camera image includes an image of a marker which is a reference of a robot coordinate system, and the interference region setting unit sets the interference region in the robot coordinate system on a basis of the image of the marker.

2. The apparatus for setting an interference region of a robot according to claim 1, wherein the color setting unit sets the color of the robot, the color search unit searches for a robot point sequence including color information corresponding to the color of the robot from the 3D map, and the interference region setting unit sets the interference region on a basis of position data of remaining point sequences of the 3D map excluding the robot point sequence.

3. The apparatus for setting an interference region of a robot according to claim 1, wherein the color setting unit sets the color of the obstacle, the color search unit searches for an obstacle point sequence including color information corresponding to the color of the obstacle from the 3D map, and the interference region setting unit sets the interference region on a basis of position data of the obstacle point sequence.

* * * * *